E. D. BENNETT.
MILK-COOLER.
No. 191,021. Patented May 22, 1877.
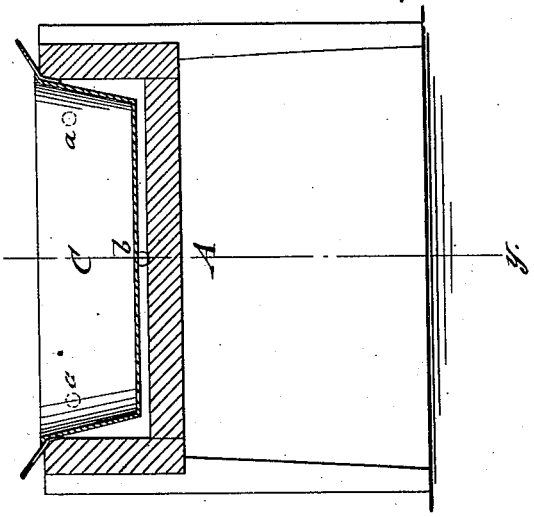
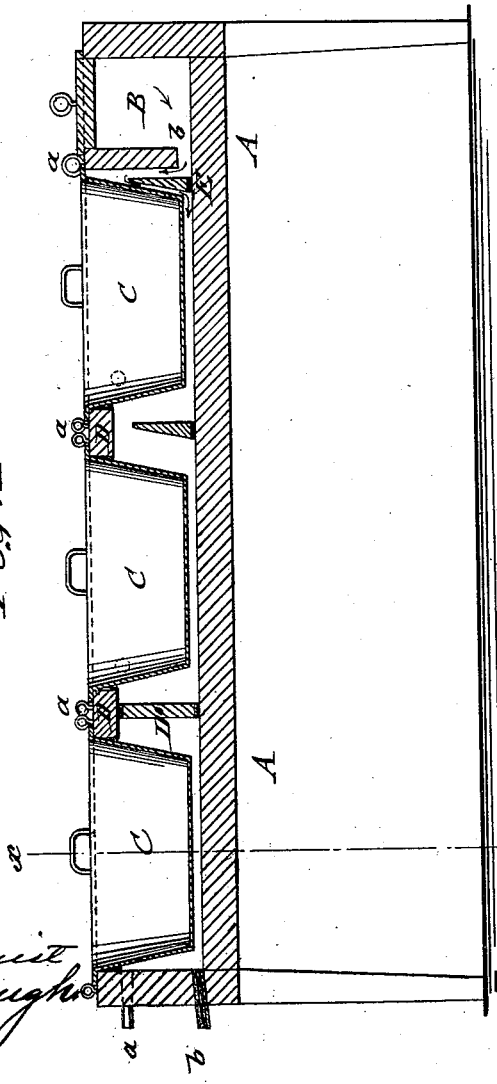
WITNESSES:
INVENTOR:
E. D. Bennett
BY
ATTORNEYS.

UNITED STATES PATENT OFFICE.

ELMORE D. BENNETT, OF ALLEGANY, NEW YORK.

IMPROVEMENT IN MILK-COOLERS.

Specification forming part of Letters Patent No. 191,021, dated May 22, 1877; application filed April 9, 1877.

*To all whom it may concern:*

Be it known that I, ELMORE D. BENNETT, of Allegany, in the county of Cattaraugus and State of New York, have invented a new and Improved Milk-Cooler, of which the following is a specification:

In the accompanying drawing, Figure 1 represents a vertical longitudinal section on line $y\ y$, Fig. 2; Fig. 2, a vertical transverse section on line $x\ x$, Fig. 1, of my improved milk-cooler; and Fig. 3 a detail view of the partition-piece.

Similar letters of reference indicate corresponding parts.

This invention relates to improvements in milk-cooling pans by which any quantity or mess of milk may be cooled separately from that in the remaining pans of the vat, the pans being cooled by spring-water direct, or by water passing through an ice-receptacle, the cold water being conducted around the pans, and drawn off at the end.

The invention consists of a water-vat with any number of pans resting on cross-pieces, and retained by fastening devices in the vat.

The cold water is agitated by one or more rubber-lined partition-strips, that are set laterally across the pans, and the vat divided by detachable partition-strips into several vats, as required.

In the drawing, A represents a vat of any suitable length, according to the number of pans used.

The pans C are of oblong shape of suitable sheet metal pressed or soldered, and preferably made with rounded-off corners, inclined sides, and end handles for readily cleaning, removing, and replacing the pans. They are supported on cross-strips D of the vat, and retained on the same so as not to be lifted by the water, when only partially filled, by screw-eyes $a$, or other suitable fastening devices that bear on the flanged rims of the pans. The water enters the vat at one end, passing through an ice-receptacle, B, which is used when the temperature of the water is not low enough, and entering through a bottom opening, $b$, of the partition-wall of the ice-receptacle into the vat proper.

One or more lateral partition-strips, E, of suitable height, which are lined with rubber or other packing at the bottom and sides, to produce a water-tight joint, are placed between the ice-receptacle and the first pan, and intermediately between two adjoining pans, so as to produce the passage of the cold water over these partition-strips, and prevent thereby the running off of the cold water at the bottom of the vat, while the warm water would rise to the top. The cold water is thereby continually agitated and mingled with the warmer water, so that it cools the sides as well as the bottom of the pans.

An additional movable partition, D′, is lined in similar manner around all the edges with packing material, and employed for the purpose of being placed below one of the cross-strips whenever it is desired to cut off a number of pans from the remaining ones. This would be necessary when new new warm milk is placed in some of the pans, so that the water that is warmed up by these lately-filled pans will not be brought in contact with the pans having colder milk, but may be drawn off directly through side faucets or openings with plugs, which are indicated in dotted lines in Fig. 1, until the temperature of the warmer milk is reduced, when the original flow of water may be resumed by removing the partition-wall.

The warm water leaves the vat at the end opposite the ice-receptacle through two discharge pipes, $a$, near the corners of the vat, which keep up the currents at both sides of the vat.

A central bottom-pipe, $b$, serves to drain off the water entirely for cleaning the vat.

The pans may be put together in nests after use, and any number of them arranged in one vat, as desired, according to the quantity of milk to be cooled.

The pans may also be used independently of the vat, the same forming, with the water-agitating strips and lateral partitions, a milk-cooler of simple and convenient construction that may be easily kept clean, and used effectively for cooling milk of different messes and temperature.

Having thus described my invention, I claim as new and desire to secure by Letters Patent—

As an improvement in milk-coolers, a water-vat supporting a number of milk-pans on cross-strips, and being provided with one or more detachable partition-strips, substantially in the manner and for the purpose set forth.

ELMORE DRAPER BENNETT.

Witnesses:
WM. W. HORTON,
JOHN P. PHILLIPS.